Patented Sept. 7, 1937

2,091,971

UNITED STATES PATENT OFFICE 2,091,971

TREATMENT OF ORGANIC COMPOUNDS

Henry Dreyfus, London, England

No Drawing. Application May 28, 1935, Serial No. 23,865. In Great Britain June 16, 1934

11 Claims. (Cl. 8—20)

This invention relates to improvements in the saponification of organic esters of cellulose, and is particularly concerned with the saponification of filaments, threads, fibres, ribbons, films and like materials comprising such esters.

The usual method of saponifying such materials is by treatment with aqueous solutions of caustic soda. The use of caustic soda, however, in common with that of other strong mineral alkalies, presents certain disadvantages. Thus unless special methods are adopted saponification is apt to be superficial, leaving a core of substantially unchanged cellulose ester, and there is some danger of excessive degradation of the cellulose molecule occurring with resulting loss of tenacity in the materials. Considerable research has therefore been carried out with a view to developing more satisfactory methods of saponifying such materials.

According to the present invention, in the saponification of organic esters of cellulose at least the first part of the desired saponification is effected with the aid of a solution containing ammonia, and a strong mineral saponifying agent is present at least during the final stages of said saponification. The process is of particular importance in the treatment of filaments, threads, fibres, ribbons, films and like materials having a basis of cellulose acetate and will be described with particular reference thereto. The process of the invention enables a relatively deep-seated saponification of filaments, threads, fibres, ribbons, films and like materials having a basis of organic ester of cellulose to be effected at a relatively rapid rate. The products of the process may exhibit a very high tenacity coupled with a good extensibility and elasticity and an affinity for cotton dyes, which may or may not be accompanied by an affinity for cellulose ester dyes.

The ammonia and the mineral saponifying agent are preferably applied to the materials in conjunction. Even very small amounts of a strong mineral saponifying agent, for example 1 to 2% or less of caustic soda or an equivalent of other strong mineral saponifying agent are capable of accelerating the process to a remarkable extent. Considerably higher concentrations of the mineral base may be employed, for example 5 to 10% or more, but the use of relatively small quantities is to be preferred. The invention is not limited to the simultaneous application of the ammonia and the mineral base, and particularly when high speed of saponification is not essential it may even be of advantage to apply the ammonia prior to the application of the mineral base. In this case the best results qua depth of saponification are obtained when a considerable proportion of the desired saponification is effected by the ammonia alone before treatment with the mineral saponifying agent. Thus it is of advantage to reduce the acidyl content of the ester to 1½ or even 1 acidyl group per $C_6H_{10}O_5$ unit before treatment with the mineral saponifying agent.

Although, as indicated above, the process of the invention is of particular importance in the treatment of cellulose acetate materials, the process is also applicable to the treatment of other organic esters of cellulose, i. e. other esters of cellulose containing organic acidyl groups. Among such esters mention may be made of other simple esters, lower fatty acid esters, for example cellulose formate, propionate and butyrate, esters of higher fatty acids, for example cellulose laurate, mixed fatty acid esters, for example cellulose acetate-propionate, cellulose acetate-butyrate and cellulose acetate propionate-butyrate, ether-esters, for example ethyl cellulose acetate and oxy-ethyl cellulose acetate, and esters containing inorganic radicles, for example nitrocellulose acetate, nitrocellulose acetate-propionate, and nitrocellulose acetate-butyrate. The ester content may be that of a completely esterified cellulose. Preferably, however, materials comprising esters of intermediate ester content, for example from 2 to 2½ ester groups per molecule, are employed. In the case of cellulose acetate, for example, it is preferable to employ acetates having an acetyl value between 48 and 58%, and preferably between 52 and 54.5% calculated as acetic acid per $C_6H_{10}O_5$ unit.

The ester may be treated in any desired form but the process is particularly suitable for treating textile and like materials having a basis of organic ester of cellulose. The materials treated may be in the form of filaments, threads, yarns, ribbons or the like or of fabrics containing such threads and the like. The organic ester of cellulose employed may be of high, normal or low viscosity, for example in the case of cellulose acetate the viscosity may be of the order of 30 to 50, 100, 200 or even higher, these figures being obtained by comparison of a 6% solution of the ester in acetone at 25° C. with glycerine at the same temperature taken as a standard of 100. Such esters of high viscosity may readily be made by methods in which degradation of the cellulose molecule is substantially avoided during acidylation, for example the methods of U. S. Patent No. 1,708,787. On the other hand, the viscosity of the cellulose acetate employed may be of the order of 10-20 or even lower, or between 20 and 30, measured on the scale referred to above.

Any suitable dry or wet spinning method may be employed in producing the filaments and the like. Special mention may be made of the methods described in U. S. applications S. Nos. 402,785 filed October 26, 1929, 418,414 filed January 3, 1930, 437,423 filed March 20, 1930, 469,622 filed July 21, 1930, and 601,043, filed March 24, 1932, wherein the materials are produced by wet spinning methods in the course of which they are stretched to a considerable extent. The materials may also, particularly when spun by a dry spinning method, be subjected to a stretching treatment prior to saponification. Such treatments are particularly valuable where a high tensile strength in the products is required, and for this purpose it is of advantage to stretch the materials to a considerable extent, for example to 200, 300 or even more than 500% of their original length. Stretching may be facilitated by any suitable means, for example by treatment with organic swelling agents or solvents or as described in U. S. application S. Nos. 4,510 filed January 18, 1935, and 4,511 filed January 18, 1935, by treatment with steam or hot water. The stretching may be effected in a single stage or in several stages, as described in U. S. application S. No. 573,424 filed November 6, 1931, with or without a rest interval between the stages. If desired after stretching and before saponification the materials may be treated with shrinking agents, as described, for example, in U. S. application S. No. 611,240 filed May 13, 1932.

Both the ammonia and the mineral base, whether applied together or successively are preferably employed in aqueous solution. Alcoholic or aqueous-alcoholic media may, however, be employed, and in this case at least a part of the saponification effected may be due to the action of the alcohol upon the cellulose ester, so that a greater degree of saponification occurs than could be accounted for by the amount of saponifying agent used. Apart from alcoholic compounds, among which ethyl and methyl alcohol are particularly suitable, swelling agents for the cellulose ester may be present during saponification. Thus, in treating cellulose acetate materials the saponifying medium or media may contain, for example, acetone, diacetone alcohol, dioxane, methylene ethylene ether and other cyclic ethers.

The concentration of the ammonia is preferably as high as can conveniently be employed. Thus concentrations of 30 to 45% of ammonia, e. g. 35 to 40%, can be employed with advantage. Considerably lower concentrations may however be employed, for example 20 to 25% or even 15 to 20% or less, but when low concentrations are used saponification is in general somewhat protracted. On the other hand, still higher concentrations, e. g. 48% ammonia may be used. As indicated above the concentration of mineral alkali employed may vary considerably from 1 or 2% or less to more than 10%. Generally speaking concentrations of 1 to 5% have been found most suitable. The temperature of the ammonia bath whether or not this also contains a mineral base may be relatively low, e. g. between 15 and 20° C. or even less but is preferably somewhat higher, e. g. 30 or 40 to 60 or 70° C. and may even be higher still, e. g. 90-100 or even above 100° C. Similar temperatures may be employed in the baths containing a mineral saponifying agent when this agent is applied after the ammonia.

Saponification may be effected by a continuous process, the materials being passed continuously through a bath containing the liquid saponifying agent at such a speed that the desired degree of saponification is effected. When the materials are treated in yarn or like form it is of advantage to draw off the yarns from a creel and treat them in warp formation, i. e. in the form of a so-called "warp" or sheet of running threads, all guides, rollers or like devices which determine the path of the materials extending across the entire warp. In some cases, for example where the nature of the saponifying agent is such that saponification is relatively slow, it is of advantage to carry out the treatment as a batch process. Yarns may, for example, be suspended in the form of hanks in a bath containing the saponifying agent or may be treated in other suitable package form, for example wound on to perforated bobbins.

Preferably the saponification is effected in a closed vessel under superatmospheric pressure, as described in U. S. application S. No. 11,080 filed March 14, 1935. In this way higher concentrations of ammonia can be used than would otherwise be possible. Saponification under pressure, although most easily carried out as a batch process may, by the use of suitable apparatus, such for example as is described in U. S. applications S. Nos. 11,080 filed March 14, 1935, and 17,242 filed April 19, 1935, be applied to travelling materials. The pressure may be relatively small, e. g. from 5 lbs. or less per square inch up to an atmosphere or may be considerably higher, for instance 2-5 or 10 atmospheres or more. It is of particular advantage to provide the saponifying vessel with end pressure chambers as described in U. S. application S. No. 17,242 filed April 19, 1935.

The materials may be saponified in fabric form. This may conveniently be effected by passing the fabric continuously through a bath containing the saponifying agent, for example in an apparatus of the type of the winch dyeing machine. On the other hand material in fabric form may be saponified by a batch method.

The materials prior to saponification may be subjected to a treatment adapted to facilitate penetration of the saponifying agent. This may comprise the application of water to the materials, or they may be treated with aqueous wetting agents, for example soaps.

The degree of saponification effected may be sufficient to produce a loss in acidyl content of the order of 10 or 15% or even less, but is preferably somewhat higher, for example sufficient to produce a loss in acidyl content of 25 or 30% up to 40% or 50% and may be higher still, for instance sufficient to reduce the acidyl content by 60-75 or 80% up to complete saponification, according to the particular purpose in view. As indicated above, when a relatively high degree of saponification is to be effected it is of advantage to reduce the acidyl content of the ester to 1½-1 acidyl group per $C_6H_{10}O_5$ unit by treatment with the ammoniacal bath.

The following examples illustrate the invention.

*Example 1*

Cellulose acetate yarn is drawn in warp formation through a closed vessel containing a 30 to 40% aqueous solution of ammonia containing 2 to 4% of caustic soda at a temperature of 80 to 120° C. and under a pressure of 5 to 10 atmospheres, the apparatus used being of the type described in U. S. application S. No. 11,080 filed March 14, 1935. The speed is adjusted according to the degree of saponification desired. The saponified yarn issuing from the saponifying vessel passes through a short washing bath whereby in excess of saponifying agent is removed, and is then dried by passage over heated rollers and collected by suitable means.

*Example 2*

The process is carried out as in Example 1 except that the ammoniacal saponifying medium is free from mineral saponifying agent. The yarn after leaving the vessel containing this medium is passed through a similar vessel containing an aqueous solution of caustic soda of concentration 1 to 3% at a temperature of 90–100° C. and then to the washing, drying and collecting means.

Instead of caustic soda other mineral saponifying agents may be employed, for example caustic potash or tri-sodium phosphate.

What I claim and desire to secure by Letters Patent is:—

1. Process for the saponification of organic ester of cellulose, wherein at least the first part of the saponification is effected with the aid of a solution containing ammonia, and a strong mineral saponifying agent is present at least during the final stages of the desired saponification, the solution being applied in liquid form and the conditions of treatment being such that deep-seated saponification occurs.

2. Process of saponifying filaments, threads, fibres, ribbons, films and like materials having a basis of organic ester of cellulose comprising treating the same with an aqueous solution of ammonia containing a relatively small quantity of a strong mineral saponifying agent, the solution being applied in liquid form and the conditions of treatment being such that deep-seated saponification occurs.

3. Process of saponifying filaments, threads, fibres, ribbons, films and like materials having a basis of organic ester of cellulose comprising treating the same first with an aqueous solution of ammonia, and then with a strong mineral saponifying agent, the solution being applied in liquid form and the conditions of treatment being such that deep-seated saponification occurs.

4. Process of saponifying filaments, threads, fibres, ribbons, films and like materials having a basis of cellulose acetate comprising treating the same with an aqueous solution of ammonia of concentration at least 30%, and containing 1 to 5% of caustic soda, under pressure.

5. Process of saponifying filaments, threads, fibres, ribbons, films and like materials having a basis of cellulose acetate comprising treating the same first with an aqueous solution of ammonia of concentration at least 30% under pressure until the acetyl content is reduced to not more than 1 acetyl group per $C_6H_{10}O_5$ unit, and then with a 2 to 5% aqueous solution of caustic soda at a temperature above 90° C.

6. Process of saponifying filaments, threads, fibres, ribbons, films and like materials having a basis of organic ester of cellulose comprising treating the same first with an aqueous solution of ammonia until the ester contains not more than 1½ acidyl groups per $C_6H_{10}O_5$ unit, and then with a strong mineral saponifying agent.

7. Process for the saponification of cellulose acetate, wherein at least the first part of the saponification is effected with the aid of a solution containing ammonia, and a strong mineral saponifying agent is present at least during the final stages of the desired saponification, the solution being applied in liquid form and the conditions of treatment being such that deep-seated saponification occurs.

8. Process of saponifying filaments, threads, fibres, ribbons, films and like materials having a basis of organic ester of cellulose comprising treating the same with an aqueous solution of ammonia containing an alkali metal hydroxide, the solution being applied in liquid form and the conditions of treatment being such that deep-seated saponification occurs.

9. Process of saponifying filaments, threads, fibres, ribbons, films and like materials having a basis of cellulose acetate comprising treating the same with an aqueous solution of ammonia containing a relatively small quantity of caustic soda, the solution being applied in liquid form and the conditions of treatment being such that deep-seated saponification occurs.

10. Process of saponifying filaments, threads, fibres, ribbons, films and like materials having a basis of cellulose acetate comprising treating the same first with an aqueous solution of ammonia, and then with an aqueous solution of an alkali metal hydroxide, the solutions being applied in liquid form and the conditions of treatment being such that deep-seated saponification occurs.

11. Process of saponifying filaments, threads, fibres, ribbons, films and like materials having a basis of cellulose acetate comprising treating the same first with an aqueous solution of ammonia until the cellulose acetate contains not more than 1½ acetyl groups per $C_6H_{10}O_5$ unit, and then with an alkali metal hydroxide.

HENRY DREYFUS.